(12) United States Patent
Toth et al.

(10) Patent No.: US 7,904,057 B1
(45) Date of Patent: Mar. 8, 2011

(54) SYSTEM AND METHOD FOR POSTING AND RETRIEVING AUDIO MESSAGES VIA DISPATCH COMMUNICATIONS

(75) Inventors: William Toth, Vienna, VA (US);
Gregory Collins, Alexandria, VA (US)

(73) Assignee: Nextel Communications Inc., Reston, VA (US)

( * ) Notice: Subject to any disclaimer, the term of this patent is extended or adjusted under 35 U.S.C. 154(b) by 988 days.

(21) Appl. No.: 11/403,365

(22) Filed: Apr. 13, 2006

(51) Int. Cl.
*H04M 1/725* (2006.01)
*H04B 7/00* (2006.01)

(52) U.S. Cl. .............. 455/412.1; 455/412.2; 455/413; 455/518; 455/519; 455/521; 455/466; 455/90.2

(58) Field of Classification Search .............. 455/518, 455/519, 412.1, 412.2, 413, 521, 466, 90.2
See application file for complete search history.

(56) References Cited

U.S. PATENT DOCUMENTS

| 5,711,011 | A  * | 1/1998  | Urs et al. .................. 455/520 |
| 6,081,707 | A  * | 6/2000  | Christensen et al. ......... 455/413 |
| 6,148,064 | A    | 11/2000 | Christensen et al. |
| 7,561,892 | B2 * | 7/2009  | Huh et al. .................. 455/518 |
| 2005/0250476 | A1 | 11/2005 | Worger et al. |
| 2005/0261016 | A1 | 11/2005 | Patel et al. |
| 2006/0014527 | A1 * | 1/2006 | Oh ........................... 455/413 |
| 2006/0063513 | A1 * | 3/2006 | Cho ........................... 455/413 |
| 2006/0189337 | A1 * | 8/2006 | Farrill et al. ................ 455/518 |

* cited by examiner

*Primary Examiner* — Wen W Huang

(57) ABSTRACT

A communication system that facilitates the transmission of audio messages via dispatch communications to subscriber units as members of a distribution list. The system includes a network device (e.g., a message application server) adapted to receive a dispatch communication including an audio message from an originating subscriber unit intended for member(s) of a distribution list; post the audio message for retrieval by the members of the distribution list; send respective notifications of the posting of the audio message to the members of the distribution list; receive requests for the audio message from the members of the distribution list; and send respective dispatch communications including the audio message to the requesting members of the distribution list.

22 Claims, 6 Drawing Sheets

SYSTEM AND METHOD FOR POSTING AND RETRIEVING AUDIO MESSAGES VIA DISPATCH COMMUNICATIONS

FIELD OF THE INVENTION

This invention relates generally to wireless communication systems, and in particular, to a system an method for posting and retrieving audio messages via dispatch communications.

BACKGROUND OF THE INVENTION

A drawback of conventional wireless communications (i.e., person to person calls) is that there is a significant delay between the time a subscriber begins the communications process and the time the recipient receives and reviews the message. For example, there is a delay due to the initiator having to dial the recipients phone number, the recipients phone ringing, accessing the recipients voice mail, and listening to voice mail options. The entire process can take in excess of 30 seconds. If the recipient wishes to access the message, they must dial into their voice mail, go through prompts before listening to the message. This process can exceed 15 seconds. If a subscriber wishes to contact multiple recipients, they must repeat this process multiple times.

To address the short comings of this type of communications, there may be a need for a similar type of communication in the form of audio. That is, it would be desirable for people to send relatively short audio messages for retrieval by one or more individuals quickly and efficiently. In addition, it is desirable for the recipients to have a similarly efficient experience when communicating to the originator.

SUMMARY OF THE INVENTION

An aspect of the invention relates to a communication system that facilitates the transmission of audio messages via dispatch communications to subscriber units as to a specific individual or members of a distribution list. The system includes a network device (e.g., a message application server) adapted to receive a dispatch communication including an audio message from an originating subscriber unit intended for a subscriber unit member(s) of a distribution list; post the audio message for retrieval by the member subscriber units of the distribution list; send notifications of the posting of the audio message to the members of the distribution list; receive requests for the audio message from the members of the distribution list; and send dispatch communications including the audio message to the requesting member subscriber units.

More specifically, the communication system comprises a network; a plurality of base transceiver stations (BTS) coupled to the network; a dispatch call controller coupled to the network; and a message application server coupled to the network. The message application server is adapted to receive a dispatch communication including an audio message from an originating subscriber unit by way of a dispatch communication session set up by the dispatch call controller; post the audio message for retrieval by one or more target subscriber units; send a notification of the posting of the audio message to the one or more target subscriber units; receive a request for the audio message from the one or more target subscriber units; and send a second dispatch communication including the audio message to the requesting one or more target subscriber units by way of a second dispatch communication session set up by the dispatch call controller.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
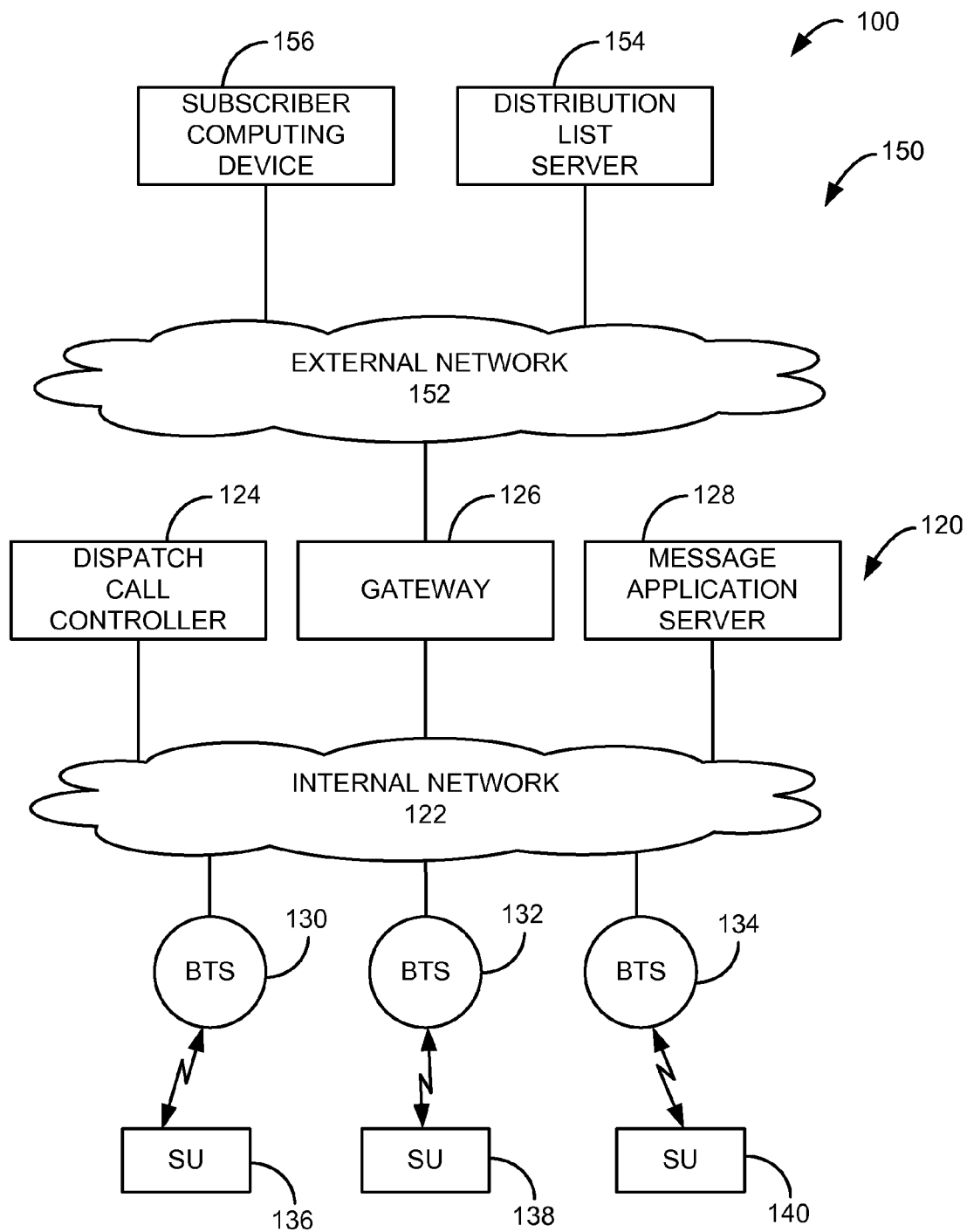
FIG. 1 illustrates a block diagram of an exemplary communication system in accordance with an embodiment of the invention.

FIG. 1 illustrates a block diagram of an exemplary communication system 100 in accordance with an embodiment of the invention. As discussed in more detail below, the communication system 100 is configured to facilitate the setup of a distribution list for receiving posted audio messages via dispatch communications; facilitate the posting of audio messages via dispatch communications; facilitate the notification of posted audio messages to those members identified in the distribution list; and facilitate the retrieval of audio messages via dispatch communications.

More specifically, the communication system 100 comprises a dispatch communication system 120 and an external network system 150. The dispatch communication system 120, in turn, comprises an internal network 122, a dispatch call controller 124 coupled to the internal network 122, a gateway 126 coupled to the internal network 122, a message application server 128 coupled to the internal network 122, and a plurality of base transceiver stations (BTS) 130, 132, and 134 coupled to the internal network 122.

The internal network 122 facilitates the transmission of dispatch communications and other types of communications between the various elements of the dispatch communication system 120, such as the dispatch call controller 124, gateway 126, message application server 128, and base transceiver stations (BTS) 130, 132, and 134. The internal network 122 may be based on any of a number of technology and protocols, including internet protocol (IP), asynchronous transfer mode (ATM), frame relay, and others.

Dispatch communications are half-duplex communications. That is, the allocation of the communication channel is to a single party at a particular time. In other words, only one party to a dispatch communication session has the channel floor to communicate with the other party or parties to the session. The remaining party or parties do not have the channel floor at that particular time, and therefore, are merely receiving the dispatch communication from the party that has the channel floor.

The dispatch call controller 124 controls the dispatch communications between parties, including the set up of a dispatch communication session, the controlling of the channel floor of the dispatch communication session, and the termination of the communication session. The gateway 126 serves as a communication interface between the internal network 122 and an external network 152 as part of the external network system 150 discussed in more detail below. The message application server 128 serves to receive audio messages to be posted from subscriber units (SUs) via dispatch communications, post the audio messages, notify recipient subscriber units (SUs) of the posting of the audio messages, and send the audio messages to the requesting subscriber units (SUs) via dispatch communications. The base transceiver stations (BTS) 130, 132, and 134 operate as an interface between the wireless environment in which subscriber units (SUs) reside and the wired medium of the internal network 122.

The dispatch communication system 120 provides dispatch communication service and possibly other types of communication service to a plurality of subscriber units (SUs), three (3) of which are shown as subscriber units (SUs) 136, 138, and 140 assigned to communicate with the system 120 via base transceiver stations (BTS) 130, 132, and 134, respectively. A subscriber unit (SU) may be any type of communication device capable of receiving and transmitting dispatch communications and possibly other types of communications. A subscriber unit (SU) need not communicate with the dispatch communication system 120 via the wireless medium, but could communicate with the system 120 via the external network 152, as in the case of a dispatch-to-desktop device.

The external network system 150 comprises an external network 152, a distribution list server 154 coupled to the external network 152, and one or more subscriber computing devices 156 coupled to the external network 152. The external network 152 may be a wide area network (WAN), such as the Internet. The distribution list server 154 may host a website accessible by subscribers for setting up distribution lists for the posted audio messages. The subscriber computing device 156, such as, for example, a desktop coupled to the Internet, may be used by subscribers for accessing the website provided by the distribution list server 154 in the set up of distribution lists.

With reference to the communication system 100, the following describes an exemplary method of setting up a distribution list; a couple of exemplary methods of receiving an audio message to be posted from an originating subscriber unit (SU) via a dispatch communication; an exemplary method of posting an audio message and notifying subscriber units (SUs) identified in the distribution list of the posting of the audio message; and an exemplary method of sending the audio message to a requesting subscriber unit (SU) via a dispatch communication.

Figure 2:
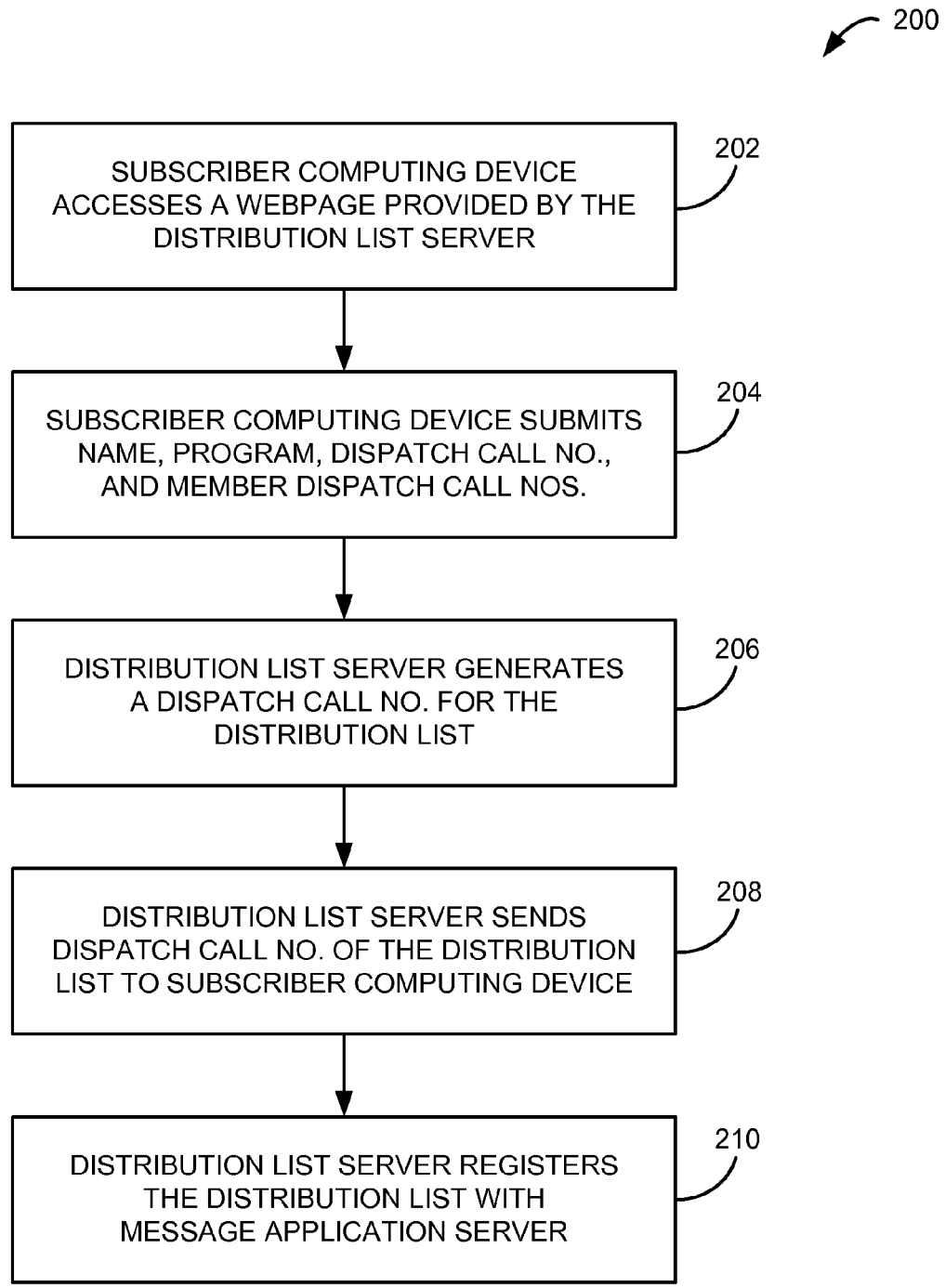
FIG. 2 illustrates a flow diagram of an exemplary method of setting up a distribution list in accordance with another embodiment of the invention.

FIG. 2 illustrates a flow diagram of an exemplary method 200 of setting up a distribution list in accordance with another embodiment of the invention. According to the method 200, a user using the subscriber computing device 156 or any of the subscriber units (SUs) 136, 138, and 140, accesses a webpage/website (e.g., an HTML file) provided by the distribution list server 154 (block 202). The webpage/website includes an input data object for creating a distribution list. The input data object may include fields for receiving the name and dispatch call number (e.g., UFMI, IP address, etc.) of the user creating the distribution list, a name for identifying the distribution list (e.g., a project name, program name, group name, etc.), and the names and dispatch call numbers of the other members of the distribution list. The user then submits the requested information to the distribution list server 154 (block 204).

In response to receiving the requested information and possibly authenticating the information, the distribution list server 154 generates a dispatch call number (e.g., UFMI, IP address, etc.) for the distribution list (block 206). As discussed in more detail below, a user calls the dispatch call number of the distribution list to post an audio message for its members. The distribution list server 154 then sends the dispatch call number of the distribution list to the subscriber computing device 156 or any subscriber unit (SU) operated by the user creating the distribution list (block 208). The distribution list server 154 then registers the distribution list with the message application server 128 by way of the external network 152, gateway 126, and internal network 122 (block 210). In registering the distribution list, the message application server 128 may create a data object for the distribution list, which may comprise the following information:

| DL Name | DL UFMI | Members | Members UFMI |
|---|---|---|---|
| X5 Jet | 987*654*3210 | John Doe (PM) | 123*456*7890 |
| | | Jane Smith | 123*456*7891 |
| | | Tom Wei | 123*456*7892 |
| | | Joe Garcia | 123*456*7893 |
| | | Priya Giri | 123*456*7894 |

The entity in the "DL Name" column identifies the name of the distribution list; the entity in the "DL UFMI" column identifies the dispatch call number of the distribution list; the entities under the "Members" column identifies the members of the distribution list; and the entities under the "Members UFMI" column identifies the dispatch call numbers of the distribution list members in the corresponding rows. Once the distribution list is registered with the member application server 128, users can post audio message for retrieval by members of the distribution list, as discussed in more detail below.

Figure 3A:
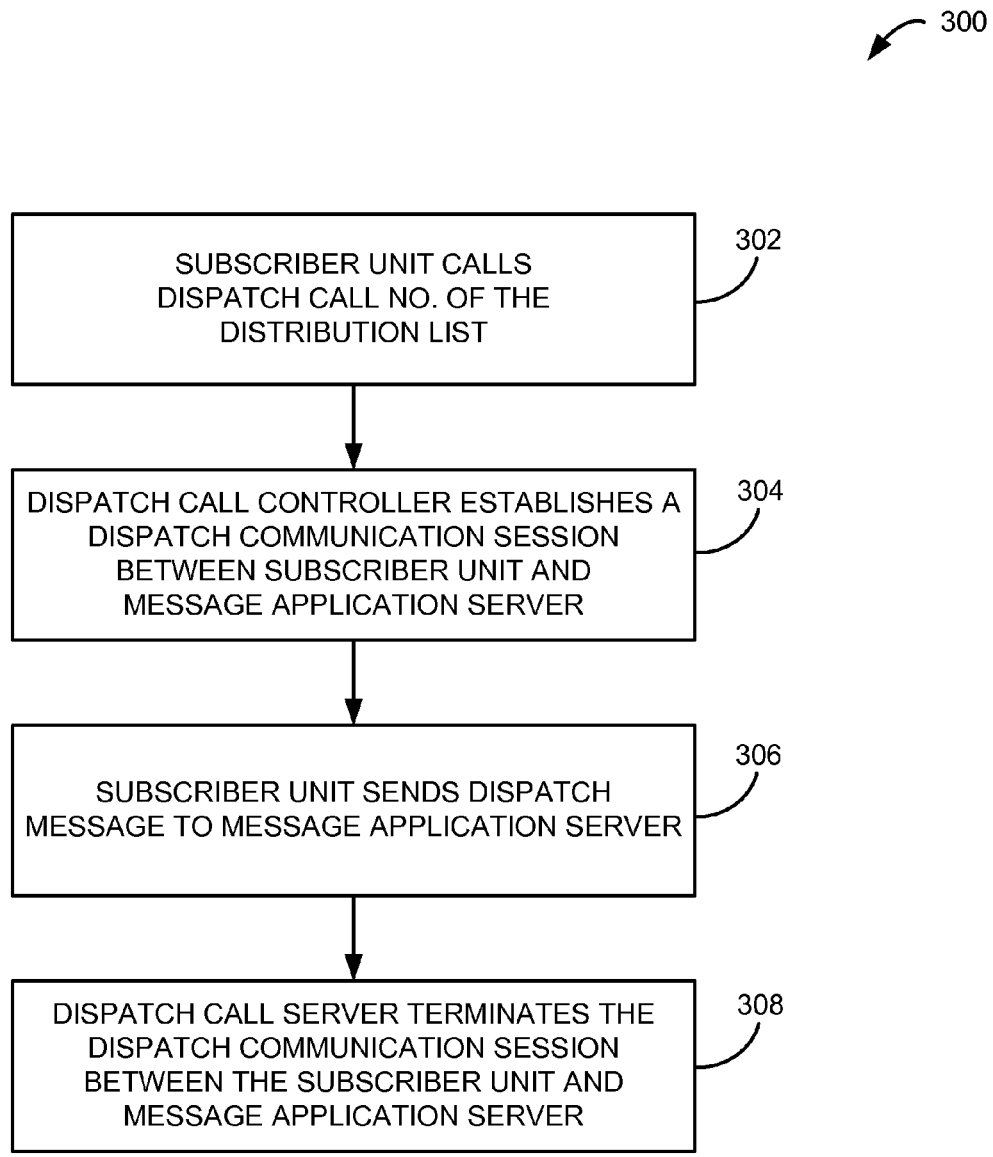
FIG. 3A illustrates a flow diagram of an exemplary method of receiving an audio message to be posted from an originating subscriber unit (SU) via a dispatch communication in accordance with another embodiment of the invention.

FIG. 3A illustrates a flow diagram of an exemplary method 300 of receiving an audio message to be posted from an originating subscriber unit (SU) via a dispatch communication in accordance with another embodiment of the invention. In this example, primary member (PM), John Doe, using subscriber unit (SU) 136 is posting an audio message for the "X5 Jet" distribution list. According to the method 300, John Doe, using the subscriber unit (SU) 136, calls the dispatch call number (e.g., 987*654*3210) of the "X5 Jet" distribution list (block 302). John Doe may perform this by selecting the "X5 Jet" name from the phone book of the subscriber unit (SU) 136, and then pressing the dispatch button on the unit. In response to John Doe initiating the call, the dispatch call controller 124 establishes a dispatch communication session between the subscriber unit (SU) 136 and the message application server 128 (block 304).

John Doe then articulates the message into the subscriber unit (SU) 136, and the subscriber unit (SU) 136 sends a dispatch communication including the audio message to the message application server 128 via the dispatch communication session created by the dispatch call controller 124 (block 306). After articulating the message, John Doe releases the dispatch button on his subscriber unit (SU) 136, and after a predetermined hang time thereafter, the dispatch call controller 124 terminates the dispatch communication session (block 308).

Figure 3B:
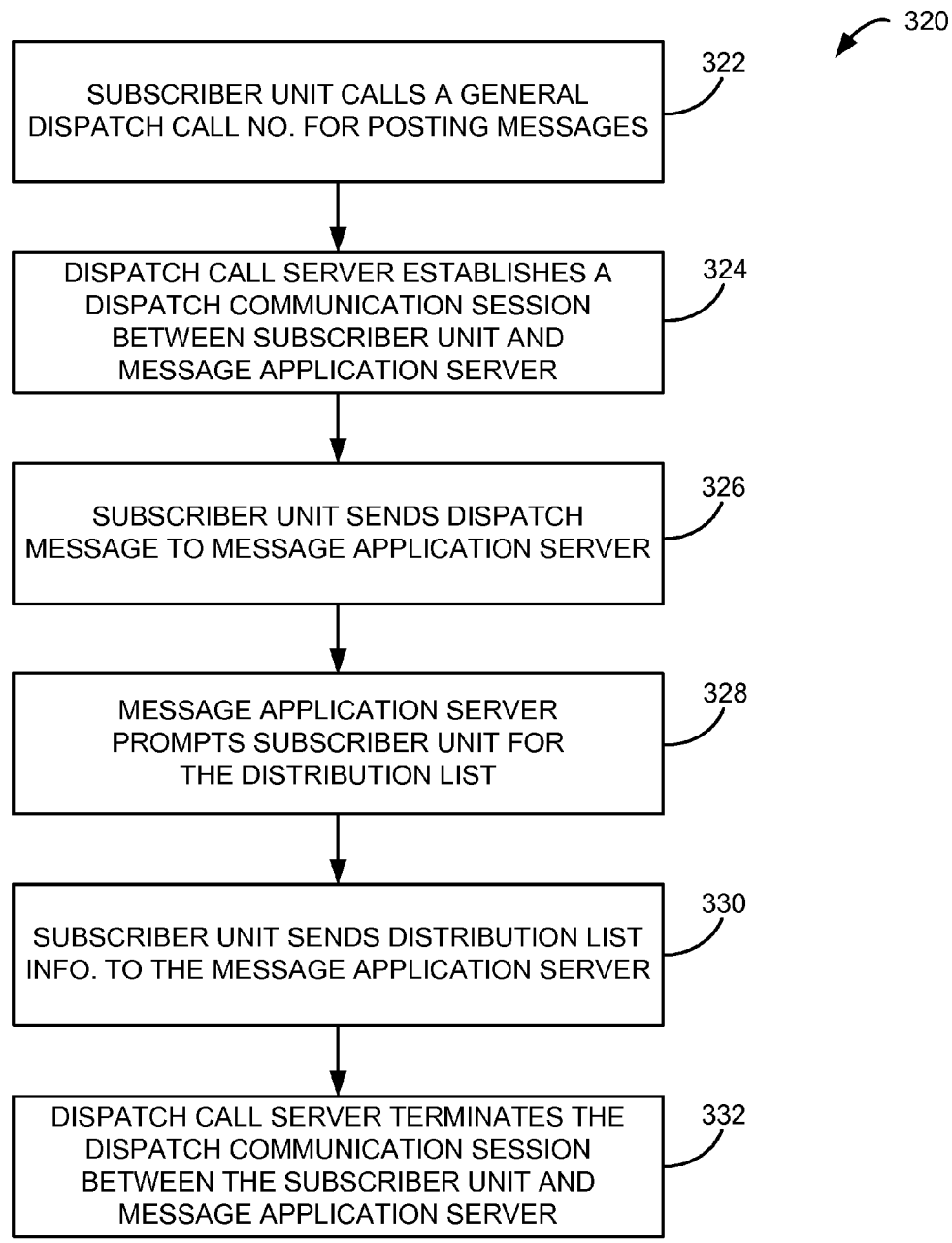
FIG. 3B illustrates a flow diagram of another exemplary method of receiving an audio message to be posted from an originating subscriber unit (SU) via a dispatch communication in accordance with another embodiment of the invention.

FIG. 3B illustrates a flow diagram of another exemplary method 320 of receiving an audio message to be posted from an originating subscriber unit (SU) via a dispatch communication in accordance with another embodiment of the invention. As in the prior example, primary member (PM), John Doe, using subscriber unit (SU) 136 is posting an audio message for the "X5 Jet" distribution list. According to the method 320, John Doe, using the subscriber unit (SU) 136, calls a general dispatch number for posting audio messages (block 322). In response to John Doe initiating the call, the dispatch call controller 124 establishes a dispatch communication session between the subscriber unit (SU) 136 and the message application server 128 (block 324).

John Doe then articulates the message into the subscriber unit (SU) 136, and the subscriber unit (SU) 136 sends the audio message to the message application server 128 via the dispatch communication session created by the dispatch call controller 124 (block 326). After articulating the message, John Doe releases the dispatch button on his subscriber unit (SU) 136; and in response, the dispatch call controller 124 opens the channel floor of the dispatch communication session. The message application server 128 then prompts John Doe for the name of the distribution list (block 328). This may be accomplished in a number of ways. For instance, the message application server 128 may send a prerecorded audio message to the subscriber unit (SU) 136 via the dispatch communication session. Or, the message application server 328 may send the prompt in the form of a Short Message Service (SMS) message to the subscriber unit (SU) 136.

In response to the prompt, John Doe, using the subscriber unit (SU) 136, sends the name of the distribution list to the message application server 128 (block 330) Again, this may be accomplished in a number of ways. For instance, John Doe may press the dispatch button and articulate the name of the distribution list. In response, the subscriber unit (SU) 136 sends the corresponding audio message (with distribution list name) to the message application server 128 via a dispatch communication. Or, John Doe may send an SMS message to the message application server 128 containing the name of the distribution list. After John Doe releases the dispatch button on his subscriber unit (SU) 136, and after a predetermined hang time thereafter, the dispatch call controller 124 terminates the dispatch communication session (block 332).

Figure 4:
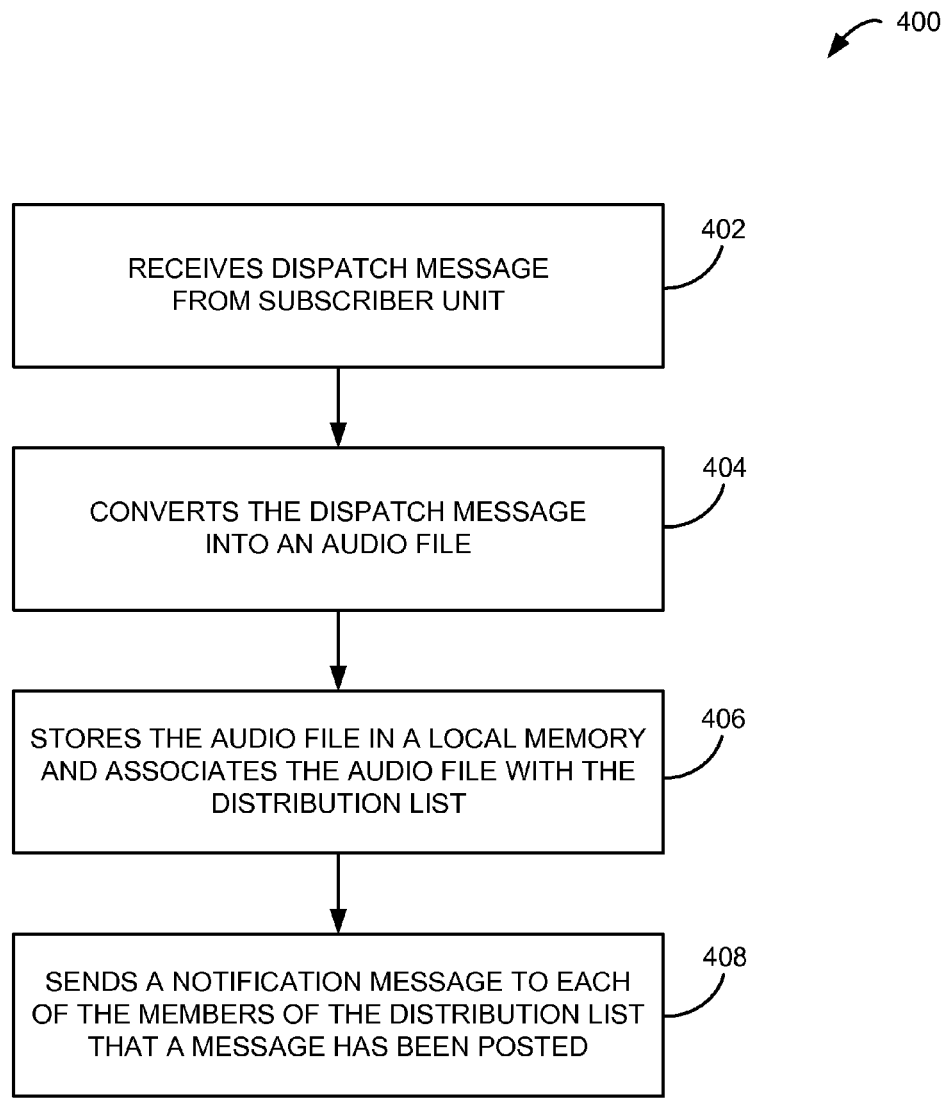
FIG. 4 illustrates a flow diagram of an exemplary method of posting an audio message and notifying the members of the distribution list of the posting of the audio message in accordance with another embodiment of the invention.

FIG. 4 illustrates a flow diagram of an exemplary method 400 of posting an audio message and notifying the members of the distribution list of the posting of the audio message in accordance with another embodiment of the invention. According to the method 400, once the message application server 128 has received the audio message from John Doe's subscriber unit (SU) 136 via the dispatch communication (block 402), the message application server 128 converts the audio message into an audio file (block 404). The audio file may be in any of a number of formats, including .mp3, .wav, and others.

After the message application server 128 has converted the audio message into an audio file, the server 128 stores the audio file in a local memory, and associates the stored audio file with the distribution list (block 406). In doing this, the message application server 128 has posted the audio message for retrieval by the members of the distribution list. As discussed in more detail below, the audio message may be stored in a data object pertaining to the distribution list. Once the audio message is stored, the message application server 128 sends a notification of the posting of the message to each recipient members of the distribution list (block 408). In this example, the message application server 128 sends notifications to the subscriber units (SUs) of Jane Smith, Tom Wei, Joe Garcia, and Priya Giri. This may be accomplished in any of a number of ways, such as by the message application server 128 sending an SMS message to these subscriber units (SUs) including the names of the distribution list and author of the message (e.g., the "X5 Jet" distribution list and author John Doe).

Figure 5:
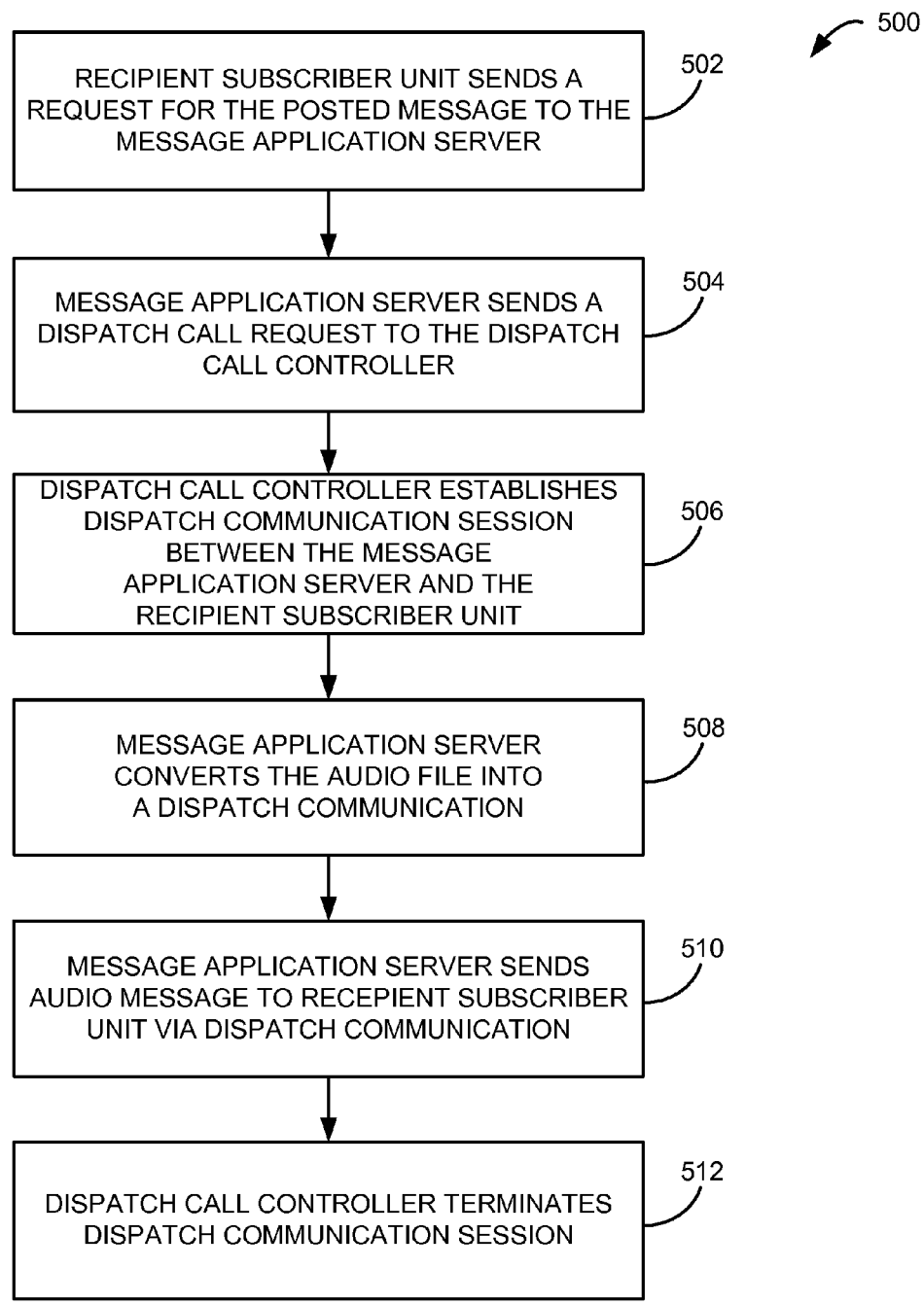
FIG. 5 illustrates a flow diagram of an exemplary method of sending a posted audio message to a requesting subscriber unit (SU) via a dispatch communication in accordance with another embodiment of the invention.

FIG. 5 illustrates a flow diagram of an exemplary method 500 of sending a posted audio message to a recipient subscriber unit (SU) via a dispatch communication in accordance with another embodiment of the invention. In this example, Jane Smith operating subscriber unit (SU) 138 retrieves the audio message posted by John Doe. According to the method 500, Jane Smith using the subscriber unit (SU) 138 sends a request for the posted audio message to the message application server 128 (block 502). Jane Smith may accomplish this by selecting the SMS message in her inbox associated with the posted audio message and pressing a "send" or dispatch button on her subscriber unit (SU) 138. The audio message request SMS message includes an identifier associated with the audio message, as discussed in more detail below. In response to the SMS message, the message application server 128 sends a dispatch call request to the dispatch call controller 124 for establishing a dispatch communication session with the subscriber unit (SU) 138 (block 504).

The dispatch call controller 124 then establishes a dispatch communication session between the message application server 128 and the subscriber unit (SU) 138 (block 506). Once the dispatch communication session is established, the message application server 128 converts the audio file of the message into a format for transmitting via a dispatch communication (block 508). The message application server 128 then sends the audio message to Jane Smith's subscriber unit (SU) 138 via a dispatch communication (block 510). Jane Smith now hears the audio message posted by John Doe. Then after the message application server 128 releases the channel floor, and after a predetermined hang time thereafter, the dispatch call controller 124 terminates the dispatch communication session (block 512). Jane Smith may be given the option of saving the audio message, as an audio file (e.g., .mp3, .wav, etc.), in a local memory of her subscriber unit (SU) 138.

As discussed above, the message application server 128 stores a data object associated with the distribution list. In addition to the distribution list membership information discussed above, the data object also includes information regarding the posted messages. In addition to the audio files of the messages, the data object may include the following information:

| MSG | Author | Date | Time | John Doe | Jane Smith | Tom Wei | Joe Garcia | Priya Giri |
| --- | --- | --- | --- | --- | --- | --- | --- | --- |
| 23456 | J. Doe | Mar. 5, 2006 | 8:35 A | N/A | Rcvd | N. Rcvd | N. Rcvd | N. Rcvd |
| 34567 | J. Garcia | Mar. 2, 2006 | 4:15 P | Rcvd | Rcvd | N. Rcvd | N/A | N. Rcvd |
| 87654 | J. Doe | Feb. 7, 2006 | 1:23 P | N/A | Rcvd | Rcvd | N. Rcvd | Not |

-continued

| MSG | Author | Date | Time | John Doe | Jane Smith | Tom Wei | Joe Garcia | Priya Giri |
|-----|--------|------|------|----------|------------|---------|------------|------------|
| 01239 | W. Clark | Feb. 3, 2006 | 2:48 P | Rcvd | N. Rcvd | Rcvd | Rcvd | Rcvd |
| 74873 | P. Giri | Jan. 9, 2006 | 9:03 A | Rcvd | Rcvd | Rcvd | Rcvd | N/A |

The entries in the MSG column indicate the identifiers of the audio messages. As discussed above, the message identifier is included in the SMS message sent by the message application server 128 to notify the subscriber units (SUs) of the posting of the audio message. In addition, as discussed above, the message identifier is also sent by the subscriber unit (SU) to the message application server 128 in its SMS request for the audio message.

The entries in the next three columns indicate the author, date and time associated with the audio messages. The entries in the next five columns indicate the retrieval status of the audio messages for the members of the distribution list, where "Rcvd" indicates that the member of the corresponding column has received the audio message of the corresponding row; "N. Rcvd" indicates that the member of the corresponding column has not received the audio message of the corresponding row; and "N/A" indicates not applicable since the member of the corresponding column is the author of the audio message of the corresponding row. Note, that a non-member, W. Clark, has posted an audio message for the members of the distribution list. Thus, the posting of audio messages need not be limited to the members of the distribution list.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A communication system, comprising:
   a first network;
   a plurality of base transceiver stations (BTS) coupled to said first network;
   a dispatch call controller coupled to said first network;
   a message application server coupled to said first network, wherein said message application server is adapted to:
      receive a first dispatch communication including an audio message from an originating subscriber unit by way of a first dispatch communication session set up by said dispatch call controller;
      post said audio message for retrieval by one or more target subscriber units;
      send a notification of said posting of said audio message to said one or more target subscriber units;
      receive a request for said audio message from said one or more target subscriber units;
      send a dispatch call request to the dispatch call controller to establish a second dispatch communication session with said one or more target subscriber units; and
      send a second dispatch communication including said audio message to said requesting one or more target subscriber units by way of the second dispatch communication session set up by said dispatch call controller.

2. The communication system of claim 1, wherein said first dispatch communication includes information related to an identity of said one or more target subscriber units.

3. The communication system of claim 1, wherein said one or more target subscriber units are members of a distribution list, and wherein said first dispatch communication includes information related to an identity of said distribution list.

4. The communication system of claim 3, wherein said identity of said distribution list comprises a dispatch call number.

5. The communication system of claim 1, wherein said message application server is adapted to receive said first dispatch communication session by way of one of said base transceiver station (BTS).

6. The communication system of claim 1, further comprising a gateway coupled to said first network and a second network, and wherein said gateway is adapted to receive said first dispatch communication by way of said second network, and send said first dispatch communication to said message application server by way of said first network.

7. The communication system of claim 1, wherein said message application server is adapted to post said audio message by associating said audio message with a data object related to a distribution list including said one or more target subscriber units.

8. The communication system of claim 7, wherein said data object includes the following information:
   an identity of said distribution list;
   a dispatch call number of said distribution list;
   an identity of said one or more target subscriber units;
   a dispatch call number of said one or more target subscriber units; and
   information related to said audio message.

9. The communication system of claim 8, wherein said information related to said audio message comprises the following information:
   a date in which said audio message was received by said message application server;
   an approximate time in which said audio message was received by said message application server; and
   information as to whether said audio message was sent to said one or more target subscriber units.

10. The communication system of claim 1, wherein said message application server is adapted to send said notification of said posting of said audio message to said one or more target units by way of a Short Message Service (SMS) message.

11. The communication system of claim 1, wherein said notification of said posting of said audio message includes information related to an identity of said audio message.

12. The communication system of claim 1, wherein said message application server is adapted to receive said request for said audio message by way of a Short Message Service (SMS) message.

13. The communication system of claim 1, wherein said request for said audio message includes information related to an identity of said audio message.

14. The communication system of claim 1, wherein said message application server is adapted to send said second dispatch communication to said one or more requesting target subscriber units by way of one of said base transceiver station (BTS).

15. The communication system of claim 1, further comprising a gateway coupled to said first network and a second network, and wherein said gateway is adapted to receive said second dispatch communication from said message application server by way of said first network, and send said second dispatch communication to said one or more requesting target subscriber units by way of said second network.

16. The communication system of claim 1, further comprising a gateway coupled to said first network and a second network, and wherein said gateway is adapted to receive registration information related to a distribution list including said one or more target subscriber units by way of said second network, and send said registration information to said message application server by way of said first network.

17. A network device adapted to:
    receive a first dispatch communication including an audio message from an originating subscriber unit;
    post said audio message for retrieval by one or more target subscriber;
    send a notification of said posting of said audio message to said one or more target subscriber units;
    receive a request for said audio message from said one or more target subscriber units;
    send a dispatch call request to a dispatch call controller to establish a second dispatch communication session with said one or more target subscriber units; and
    send a second dispatch communication including said audio message to said requesting one or more target subscriber units.

18. The network device of claim 17, wherein said one or more target subscriber units are members of a distribution list, and wherein said first dispatch communication includes information related to an identity of said distribution list.

19. The network device of claim 18, wherein said identity of said distribution list comprises a dispatch call number.

20. The network device of claim 17, further adapted to post said audio message by associating said audio message with a data object related to a distribution list including said one or more target subscriber units.

21. The network device of claim 17, further adapted to receive registration information related to a distribution list including said one or more target subscriber units.

22. A method comprising:
    receiving a first dispatch communication including an audio message from an originating subscriber unit;
    posting said audio message for retrieval by one or more target subscriber units;
    sending a notification of said posting of said audio message to said one or more target subscriber units;
    receiving a request for said audio message from said one or more target subscriber units;
    sending a dispatch call request in response to the request for said audio message to establish a second dispatch communication session with said one or more target subscriber units; and
    sending a second dispatch communication including said audio message to said requesting one or more target subscriber units.

* * * * *